United States Patent [19]

Stubbmann

[11] 3,998,234
[45] Dec. 21, 1976

[54] ANIMATABLE MUSICAL TOOTHBRUSH HOLDER

[76] Inventor: Albert Stubbmann, 746 Dakota Trail, Franklin Lakes, N.J. 07417

[22] Filed: July 31, 1975

[21] Appl. No.: 600,284

[52] U.S. Cl. .............................. 132/84 R; 132/84 D
[51] Int. Cl.² ......................................... A45D 44/18
[58] Field of Search .............. 132/84 R, 84 C, 84 D

[56] References Cited
UNITED STATES PATENTS

| | | | |
|---|---|---|---|
| 2,563,733 | 8/1951 | Meczelski | 132/84 D X |
| 2,828,504 | 4/1958 | Nugent | 132/84 R |
| 3,246,361 | 4/1966 | Blackmon | 132/84 R |

*Primary Examiner*—G.E. McNeill
*Attorney, Agent, or Firm*—Kirschstein, Kirschstein, Ottinger & Frank

[57] ABSTRACT

A housing is provided with a shallow recess having an animatable display positioned therein protected by a transparent shield. The animatable display includes a stationary fanciful representation of a character prominently displaying its teeth and movable representations of an arm and a hand carrying a replica of a toothbrush with its bristles adjacent the prominently displayed teeth. The character is standing in front of a sink on the stationary display. The movable representations of the animatable display are in operable communication with a spring driven musical movement within the housing and will be reciprocally translated in a generally vertical direction while the musical movement is playing. The musical movement is controlled by a blocking arm having a portion extending from the housing to form a control tab. The blocking arm is movable between two positions. In one position the blocking arm will prevent the activation of the musical movement and in the other position will permit the musical movement to play. The housing also has a holder for supporting at least one toothbrush.

A timer may be provided which is responsive to the starts and stops of the musical movement to indicate the length of time that the child has brushed his or her teeth.

13 Claims, 9 Drawing Figures

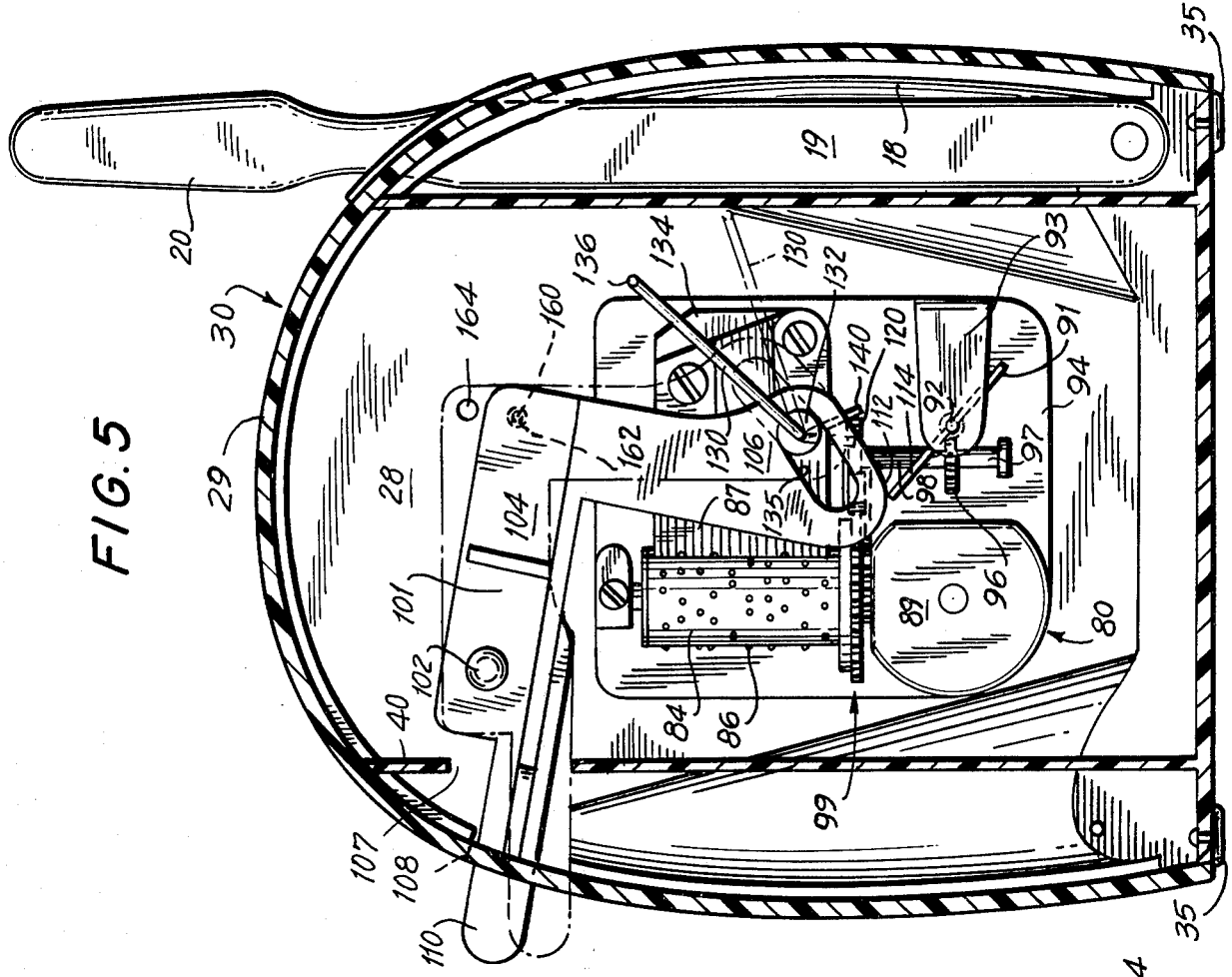
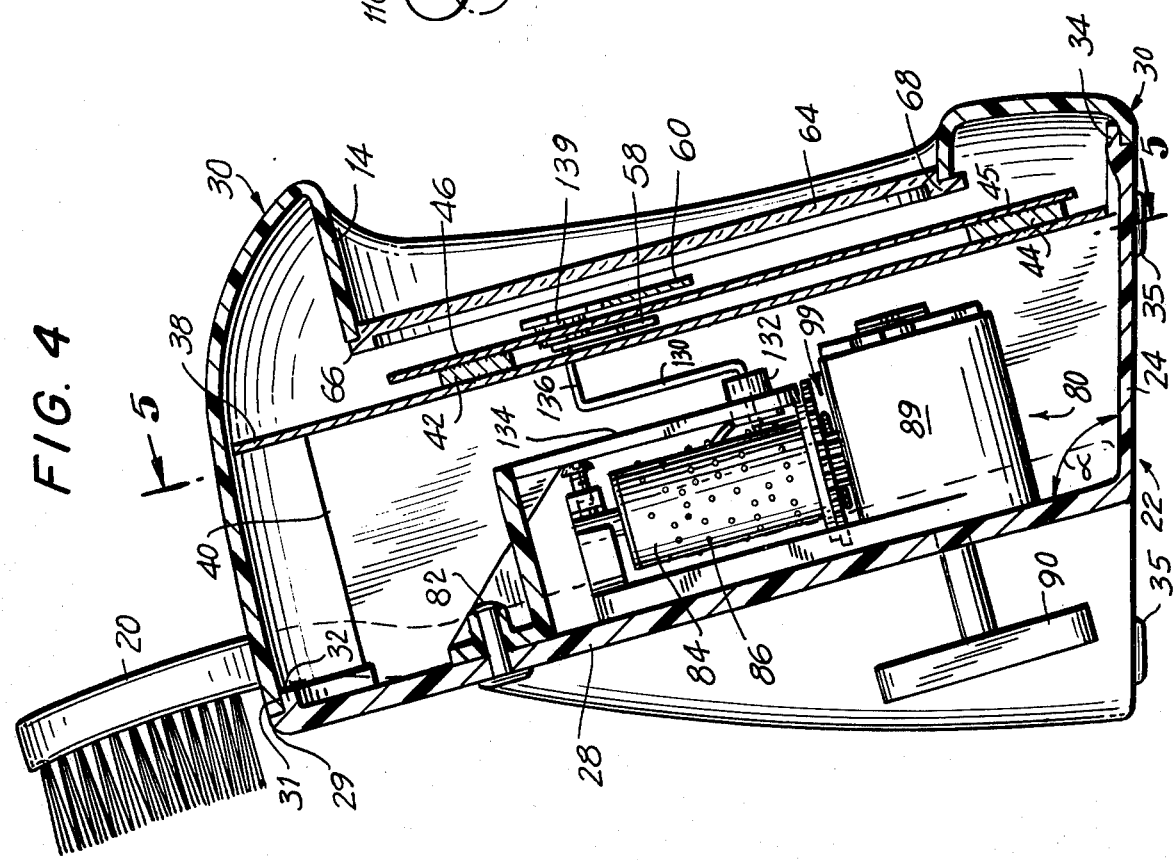

ANIMATABLE MUSICAL TOOTHBRUSH HOLDER

BACKGROUND OF THE INVENTION

1. Field of the Invention

The invention relates to a toothbrush holder and more particularly, to an animatable musical toothbrush holder and brushing timer in which the animation shows the child the proper way to brush teeth and is, along with the music accompaniment, controlled independently of the positioning of a toothbrush within the holder.

2. Prior Art

There are several prior art devices which act as toothbrush holders and which provide an incentive for a small child to brush his or her teeth for a predetermined period of time. These devices, generally, have displayed thereon the facial features of animals with teeth. The devices are activated by removing the toothbrush from a receptacle. When the toothbrush is removed the device is activated, resulting in music and/or the animation of the display. The animated display represents an animal in the act of brushing its teeth. The music and/or animation will continue until the activating mechanism runs down or the toothbrush is replaced in its receptacle.

For example, the Stone U.S. Pat. No. 2,926,487 discloses a toothbrush holder wherein the removal of the toothbrush from the holder will activate the musical system and the animatable representation on the housing. Replacing the toothbrush in the holder will stop the music and ready the device for the next cycle of operation.

Another U.S. Pat. No. to Stone 3,021,666 discloses an animatable toothbrushing timer wherein removal of the toothbrush from the holder will activate the device. The child brushes his teeth until the action stops. Insertion of the toothbrush back into the holder will ready the device for the next user.

These two devices and the prior art in general, while attempting to provide a device useable to induce a child to brush his teeth for a reasonable period of time have a major drawback. The music and animation in the devices begin when the toothbrush is removed from the holder. None of these devices take into account the fact that they are to be used by young children, whose manual dexterity still might not be fully developed. The fact that an indeterminate time is required for a child to apply toothpaste to the brush is ignored. Therefore, a young child might find it difficult to completely apply toothpaste to the toothbrush and brush his teeth long enough before the timer has run down.

Further, the animatable displays in the prior art do not depict the proper brushing motion generally accepted by the dental profession as conducive to good dental hygiene.

Moreover, the devices disclosed in the Stone patents require fragile and fairly complex mechanisms which increase appreciably the cost of the devices and the possibility that, if the device is accidentally dropped by the child, it will become inoperable.

It is toward elimination of these and other problems that the present invention is directed.

SUMMARY OF THE INVENTION

Purposes of the Invention

It is an object of the present invention to provide a toothbrush holder which will induce a child to brush his or her teeth for a predetermined period of time that is unaffected by the time required to apply toothpaste to a toothbrush.

Another object of the present invention is to provide a toothbrush holder which when in operation includes an emulatable animated representation of a character brushing its teeth with musical accompaniment.

Still another object of the present invention is to provide a toothbrush holder wherein the animation and musical accompaniment is controlled independently of the positioning of the toothbrush within the toothbrush holder.

A further object of the present invention is to provide a toothbrush holder which includes an animatable representation that, when activated, accurately depicts the accepted brushing technique most conducive to good dental hygiene.

Other objects of the invention in part will be obvious and in part will be apparent in the following description.

Brief Description of the Invention

Generally, the foregoing and other objects are achieved by providing a housing having a shallow recess therein and a holder for supporting at least one toothbrush. An animatable display including a stationary fanciful representation of a character prominently displaying its teeth appears in the shallow recess and is protected by a transparent shield. Associated with the stationary representation are movable representations of an arm and a hand carrying a replica of a toothbrush with its bristles adjacent the prominently displayed teeth.

A musical movement, preferably spring motor driven within the housing, is controlled by a blocking arm having a control tab extending from the housing. The control tab is movable between a first and a second position. When the control tab is in the first position the blocking arm intercepts the path of movement of a member which is a part of the musical movement to prevent the musical movement from operating and producing music. When the control tab is in the second position the movement of said member is free and the musical movement is activated to produce music. The movable arm and hand representations in the animatable display are in operable communication with the musical movement so that while the musical movement is activated, the arm and hand are reciprocally translated in a generally vertical direction.

To use the device, a child removes the toothbrush from the holder and applies toothpaste to the bristles. After the toothpaste is applied, the child manipulates the control tab to its second position to activate the musical movement. The arm and hand move when the musical movement is activated so that the bristles of the toothbrush move lengthwise along the teeth, simulating proper brushing action. The child will brush his or her teeth in time to the music, and will emulate the movement of the toothbrush along the character's teeth. The musical movement will play until its spring motor runs down. The control tab is then moved to its first position and the motor wound so that the device is ready for its next cycle of operation.

A timer may also be provided which is started and stopped with the musical movement to indicate the length of time the child has brushed his or her teeth.

The invention consists in the features of construction and arrangement of parts which will be detailed hereinafter and described in the appended claims.

BRIEF DESCRIPTION OF THE DRAWINGS

For a better understanding of the present invention, reference should be had to the accompanying drawings, wherein like numerals of reference indicate similar parts throughout the several views and wherein:

FIG. 4 is a sectional view taken substantially along the line 4—4 of FIG. 3;

FIG. 5 is a sectional view taken substantially along the line 5—5 of FIG. 4;

DESCRIPTION OF THE PREFERRED EMBODIMENT

Figure 1:
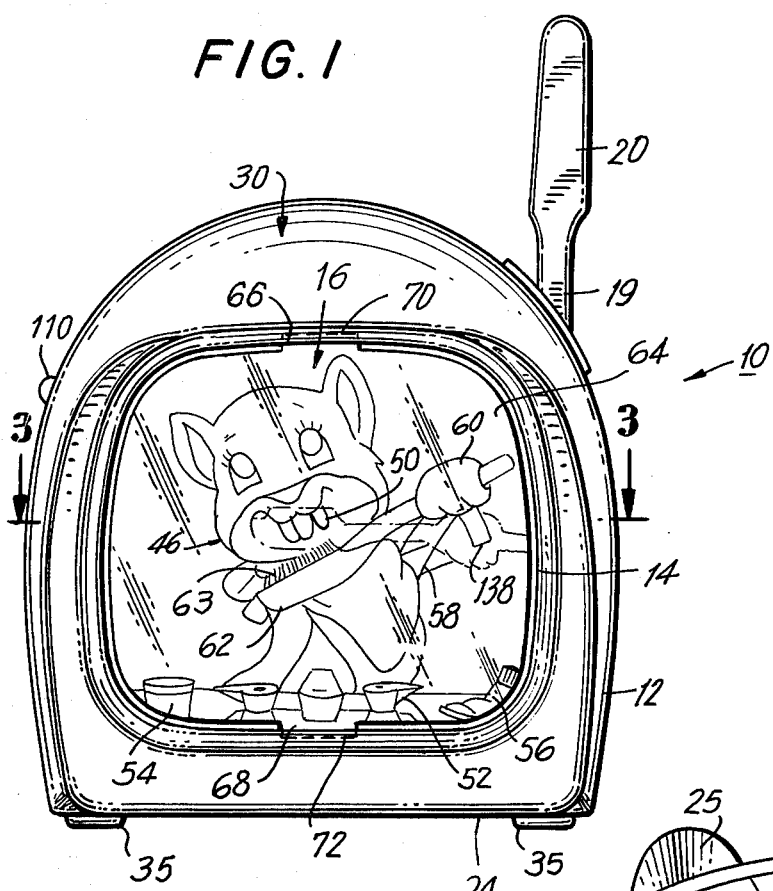
FIG. 1 is a front view of an animatable musical toothbrush holder in accordance with the present invention.
Figure 2:
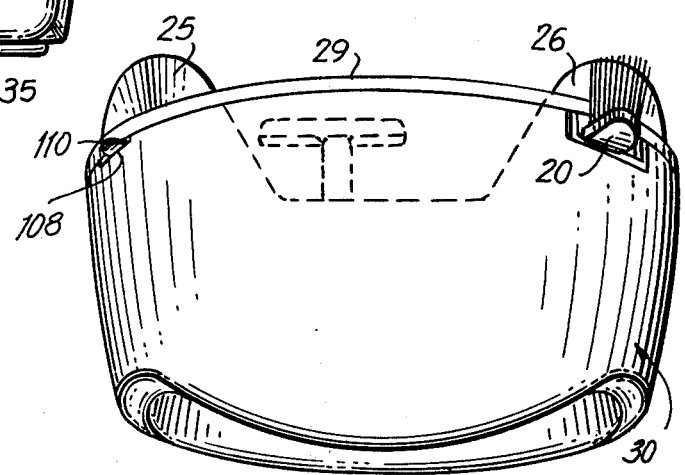
FIG. 2 is a top view of the animatable musical toothbrush holder illustrated in FIG. 1.

An animatable musical toothbrush holder in accordance with the present invention is illustrated in FIG. 1 and is identified generally be the reference numeral 10. The animatable musical toothbrush holder 10 includes a housing 12 having a large shallow recess 14 in its front face. Positioned within the shallow recess 14 is an animatable display 16 which will be described hereinafter in detail. The housing 12 has associated therewith a holder in the form of a vertical elongated chamber 18 adapted to receive the stem 19 of a toothbrush 20 for holding and storing the toothbrush during periods of non-use. It is to be understood that while the holder is illustrated as adapted to receive one toothbrush stem it may be so sized, or additional holders provides so that the animatable musical toothbrush holder may support a plurality of toothbrushes.

Figure 3:
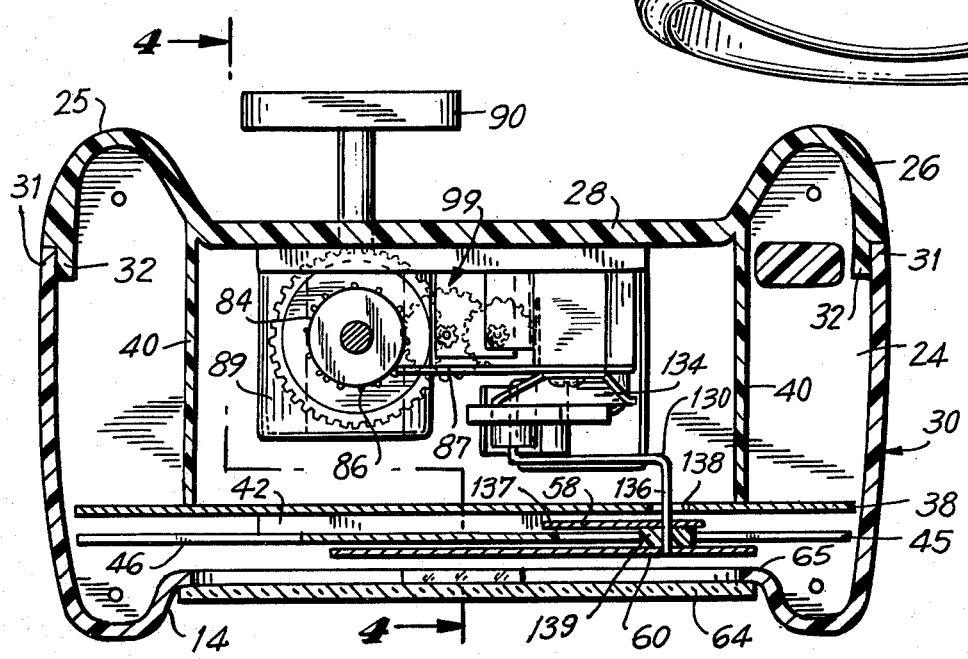
FIG. 3 is an enlarged sectional view taken substantially along the line 3—3 of FIG. 1.

The housing 12 which may be formed of a high impact plastic, e.g., ABS, or other suitable material, has a base 22 with a bottom 24 having rearwardly extending stabilizing portions 25 and 26 and a rear wall 28 having an arched top 29. A cover 30 is secured to the base. As can be seen in FIGS. 3 and 4 the rear edge 31 of cover 30 cooperates with a peripheral shoulder 32 on the rear wall 28 and a peripheral shoulder 34 on the bottom 24 and may be fastened thereto as by suitable adhesive means. The rear wall 28 may rise from the bottom 24 at an angle α as shown in FIG. 4 to permit the animatable display, which is secured thereto in a manner which will be described, to be in full view if the holder is rested on a horizontal surface, e.g., a countertop or sink, which may be below a child's eye level. Rubber pads 35 may be provided on the bottom 24 to establish a clearance between the bottom and the surface on which the holder sits so that the holder will not scratch or mar the surface if the child moves the holder on the surface.

Figure 9:
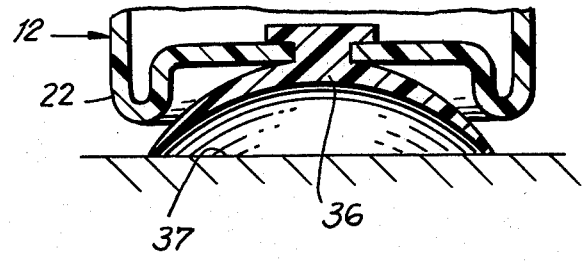
FIG. 9 is a detail view of the lower portion of an animatable musical toothbrush holder secured to a surface by an optional mounting means.

Alternatively, mounting means in the form of recessed suction cups 36 (FIG. 9) may be provided at each corner of the base to add to the stability of the holder and to prevent it from falling off a surface 37 while being manipulated by a child. In another alternative embodiment, not shown, the holder may be mounted to a wall by a bracket.

The exact form of the housing 12 is not material and may be varied to suit commercial variants. The housing, however, desirably has rounded contours and is devoid of sharp edges which might cause injury to a small child if it should be accidentally dropped.

The animatable display 16 has a background 38 which is supported within the housing by ribs 40. Held stationary on the background 38 but spaced forwardly therefrom by mounts 42 and 44 is a plate 45 bearing on its front face a stationary representation generally designated 46 of a head and upper torso of an animal character or other figure calculated to catch the fancy of a child. To induce a small child to brush his or her teeth, the character is shown with its mouth open and having teeth 50 prominently displayed. Included in the representation 46 are items such as a sink top 52, a cup 54, and tube 56 of toothpaste to make it appear as if the animal or other figure is standing in front of a lavatory (as viewed by mirrored reflection). When the child looks at the animatable display he will get the impression that he is seeing his own image in a mirror so that he will be induced to emulate the action hereinbelow described.

Associated with the stationary representation 46 are a representation of an arm 58 and a representation 60 of a hand, paw or the like holding a simulated toothbrush 62 with the bristles 63 adjacent the teeth 50 of the figure 46. Both representations 58 and 60 are in operably coupled to (kinematically connected to) a musical movement within the housing and will be reciprocally translated in a generally vertical direction during the operation of the musical movement as will hereinafter be described.

A transparent shield 64 is positioned over the animatable display behind the shallow recess 14. The shield 64 is held against a shoulder 65 on the perimeter of the shallow recess 14 by tabs 66 and 68 integrally formed with the shield which are frictionally received in slots 70 and 72 in the shoulder 65.

In order to provide musical accompaniment for the animation a musical device is positioned within the housing 12, the beat of the music being selected to provide a suitable pace for a child to follow in brushing his teeth. The musical device is preferably a spring driven musical movement 80, of the type commonly found in music boxes, and is mounted on the rear wall 28 by a fastener 82. Musical devices of this type have a playing time of approximately two minutes but can be designated to play for a longer period. The device should not play for a shorter time since a child should brush his teeth for at least 2 minutes.

Figure 6:
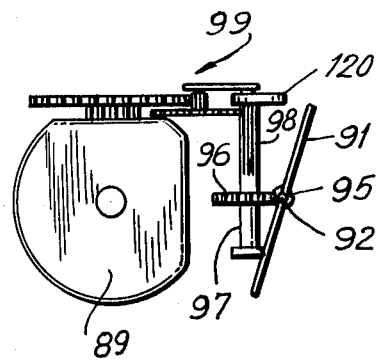
FIG. 6 is an enlarged detail view of a portion of the musical movement and operable connection in accordance with the present invention.

The musical movement shown includes a rotary drum 84 provided with a plurality of stub pins 86 which during the rotation of the drum brush past the tips of a set of musical reeds 87 which when vibrated reproduce various musical tones. The rotary drum 84 is driven by a spring motor 89 which is wound by a key 90. The music movement includes a governor in the form of a vane 91 which is spun by the spring motor 89. As shown in FIGS. 5 and 6, the vane 91 is fixed to a rotary shaft 92 which is journaled for rotation at its opposite ends in a bearing member 93 and the base 94 of the music movement. The rotary shaft 92 is provided with a worm gear 95 and mates with a driving worm wheel 96 on a drive shaft 97. Shaft 97 has teeth 98 which through a gear train 99, is operably connected to the spring motor 89.

Characteristic of such musical movements is the fact that if the vane 91 is prevented from spinning the musical movement is stopped and no music is reproduced. A control means is provided which regulates the operation of the musical movement 80 by interrupting the spinning of the vane 91. As can be seen best in FIG. 5, a blocking arm 101 is pivotably mounted by a pin 102 on the rear wall 28 and includes a lateral portion 104 and a blocking extension 106. The rib 40 is provided with an opening 107 to permit the lateral portion 104 to pass therethrough. Part of the lateral portion 104 extends through a slot 108 in the housing 12 to form a control tab 110. When the control tab 110 is in a first position near the top of the slot 108, as illustrated, a wing 114 of vane 91 will strike an edge 112 of the blocking extension when the spring motor is wound and will be prevented from rotating. The musical movement will not play. When the control tab 110 is moved to a second position, near the bottom of the slot 108, as illustrated in phantom lines, the edge 112 is moved clear of the wing 114 and the vane is permitted to rotate. The musical movement can then play. If it is necessary to stop the music movement before the spring motor runs down, the control tab 110 is moved back to the first position, wherein the vane 91 is prevented from rotating.

To prevent accidental shifting of the control tab between the first and second positions, a pimple 160 is provided on the blocking arm 101 which is receivable in either of two dimples 162 or 164 when the control tab is in the first or second position respectively. A slight force well within the physical capabilities of a young child, must be exerted on the control tab to displace the pimple from either of the dimples.

As mentioned hereinabove, the animatable display 16 has movable representations of an arm and and or paw which are operably coupled and responsive to the operation of the musical movement 80. There is illustrated in FIG. 5 an eccentric cam 120 fixed on shaft 97. To impart motion to the movable representations so that they are reciprocally translated in a generally vertical direction, a connecting rod 130 having offset ends is pivoted in a bearing 132 which is mounted to the base 94 of the musical movement by bracket 134. The blocking element 106 is provided with an elongated opening 135 to pass the connecting rod. The bearing 132 which provides an axis of rotation about which the ends of the connecting rod and the movable representations of the arm or paw and toothbrush oscillate is positioned on the bracket 134 behind the background 38 at a point between the movable representations and the body of the character in the stationary representation so that the display, when animated, presents a realistic and correct brushing movement of the arm and hand.

A first end of the rod 130 designated 136 extends through an arcuate slot 138 in the background 38. The representations 58, 60 and 62 are mounted on the end 136 and are permitted limited rotation thereon. The arm representation 58 has a free end 137 which is so located in the space between the background 38 and the stationary representation 46 of the torso of the character that the arm during animation will appear to be moving from the shoulder of the stationary representation. A spacer 139 separates the representations 58 and 60 on the end 136 so as to situate the arm representation behind the paw and toothbrush representation in front of the stationary representation 46 and thereby seem a more like life appearance.

A second end 140 of the rod 130 is urged against the edge of the cam 120 by the moment created by the combined weight of the connecting rod 130 and the movable representations 58 and 60 about the axis of the bearing 132. When the musical movement is playing the eccentric cam will rotate, displacing the end 140 as shown in dotted lines in FIG. 5. Consequently the end 136 is displaced. The representations mounted on the end 136 are reciprocally translated so that the bristles 63 on the representation of the toothbrush 62 move lengthwise over the teeth 50. The resulting animation simulates a realistic brushing action since both the representations of the arm and hand move about the axis established by the bearing 132 between the hand and the body of the character. The manner in which the bristles 63 pass over the teeth 50 i.e., generally vertically, is the accepted way to brush in order to develop good dental hygiene.

To use the device the control tab 110 is placed in its first position and the spring motor 89 is wound by turning the key 90. The child removes the toothbrush 20 from the holder 18 and applies toothpaste to the bristles. After the toothpaste is applied the child shifts the control tab 110 to its second position and the musical movement 80 starts to reproduce music. Simultaneously therewith, the representations 58 and 60 move making it appear that the toothbrush is cleaning the character's teeth. It has been found that such animation with musical accompaniment captures the fancy of young children and that they will attempt to emulate the action that they are viewing, which is the proper way to brush their teeth, in time to the music. The musical movement will play and the animation will continue until the fully wound spring motor 89 runs down, which ordinarily occurs in about two minutes, therefore, the child will brush his or her teeth for about 2 minutes. If it is desired to stop the device before the 2 minutes has lapsed, the control tab 110 is moved back to its first position. The musical movement can be designed for different periods of play.

Figure 7:
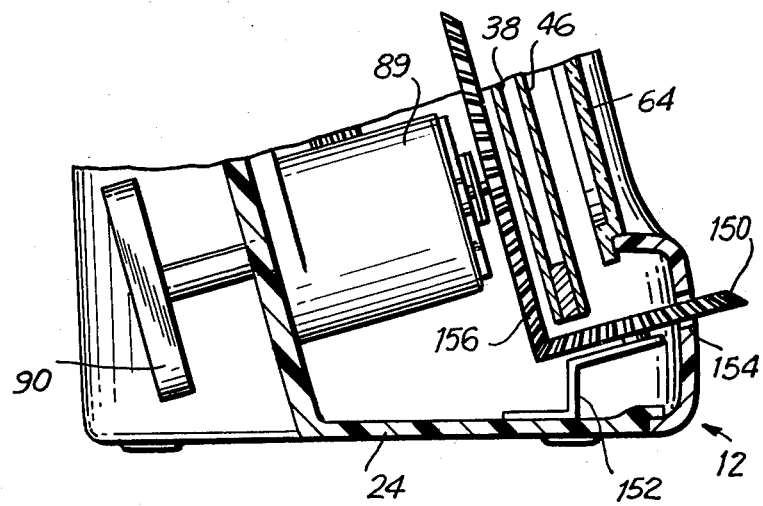
FIG. 7 is an enlarged partial sectional view illustrating an alternative embodiment of the present invention having a timer associated with the musical movement.
Figure 8:
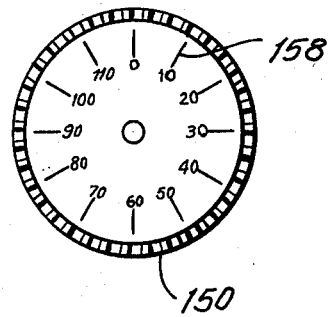
FIG. 8 is a top view of the timer disc illustrated in FIG. 7.

For the case where an older child uses the device, a timer is provided which will tell him how long he has brushed his teeth. This is illustrated in FIGS. 7 and 8. A timing mechanism is in kinematic communication with the musical movement and is started when the musical movement begins to play and stopped when the movement stops to visually indicate the period of time the child has brushed his teeth. A disc 150 is rotatably mounted on a bracket 152 within the housing 12. A portion of the disc extends from the housing through a slot 154. When the spring motor 89 begins to drive the music movement, a gear 156 turned by the motor will rotate. The gear meshes with the toothed periphery of the disc, causing the disc to rotate. The sizes of the gear 156 and timing disc 150 are such to cause the timing disc to move an angular distance corresponding to one second for each second that the music movement is playing. The disc 152 has indicia 158 thereon (FIG. 8) to provide a visual indication of the portion of 2 minutes that the disc has been rotating. Where music devices having longer playing times are used, the timer can be sized to measure the longer time period. A child who can read, can then stop the device after he has brushed for a predetermined time period as indicated by the timer.

It can be seen from the foregoing detailed description that the objects of the present invention, namely, to provide an animatable musical toothbrush holder wherein the music and animation functions are controlled independently of the positioning of a toothbrush within the holder, has been achieved by a housing having a holder for supporting at least one toothbrush therein. Carried by the housing is an animatable display including a stationary fanciful representation of a character prominently displaying its teeth and a movable representation of an arm and hand or paw carrying a toothbrush adjacent the prominently displayed teeth. The arm is behind the character and the paw and toothbrush are in front of the character. The movable representations are operably connected to a spring motor driven musical movement within the housing and are reciprocally translated in a generally vertical direction when the musical movement is operating. The operation of the musical movement is controlled by a blocking arm, a portion of which extends from the housing to form a control tab.

To use the device, a child removes a toothbrush from the holder and puts toothpaste on the bristles. The child then manipulates the control tab from a first position in which the musical movement is prevented from playing to a second position in which the musical movement is activated. Simultaneously therewith the movable representations of the arm and hand are reciprocally translated so that the bristles of the toothbrush moves lengthwise along the character's teeth making it appear that the toothbrush is cleaning the character's teeth. The child will emulate the action that he sees before him and will brush his teeth for a sufficient length of time and in a manner accepted as conducive to good dental hygiene. The musical movement will stop playing and the animation will cease when the spring motor runs down.

A timer may be provided which is responsive to the starting and stopping of the musical movement to indicate the length of time the child has brushed his or her teeth.

What is claimed is:

1. An animatable musical toothbrush holder comprising:
   a. a housing;
   b. a musical movement having stationary and movable components within said housing;
   c. a stationary representation of a character associated with said housing;
   d. a movable representation in association with said stationary representation, said movable and said stationary representations constituting different portions of an animatable display;
   e. means for operably coupling said movable components of said musical movement and said movable representation so that said animatable display is animated while said musical movement operates;
   f. at least one holding means in association with said housing adapted for supporting at least one toothbrush; and
   g. control means for selectively starting and stopping said musical movement, said control means being independent of the positioning of a toothbrush within said holding means.

2. The device in accordance with claim 1 wherein said musical movement includes a movable member, said control means cooperating with said movable member to start and stop said musical movement.

3. The device in accordance with claim 2 wherein said musical movement is spring motor driven and said movable member is a vane which prevents the operation of said musical movement unless it is free to rotate, said control means interrupting the rotation of said vane to stop said vane from rotating.

4. The device in accordance with claim 3 wherein said control means comprises:
   a. a blocking arm pivotably mounted within said housing;
   b. a control tab integrally formed with said blocking arm extending from said housing and movable between a first and a second position; and
   c. a blocking extension on said blocking arm in operable engagement with said vane, said blocking extension interrupting rotation of said vane to prevent said musical movement from operating when said control tab is in said first position and being moved clear of said vane to permit operation of said musical movement when said control tab is in said second position.

5. The device in accordance with claim 1 wherein said coupling means comprises:
   a. an eccentric cam in kinematic communication with said movable component of said musical movement and rotating when said musical movement is operating;
   b. a bearing within said housing to create an axis of rotation; and
   c. a connecting arm having offset first and second ends, said connecting arm being pivotably mounted in said bearing, said first end of said connecting arm having said movable representation pivotably mounted thereto, and said second end bearing against said eccentric cam, said second end being displaced as said eccentric cam rotates causing a corresponding displacement of said first end about said axis resulting in the animation of said animatable display.

6. The device in accordance with claim 1 wherein said stationary display includes a fanciful character with prominently displayed teeth, and wherein said movable representation includes a representation of an arm and a representation of a hand carrying a toothbrush with its bristles adjacent said prominently displayed teeth, said movable representation being reciprocally translated in a generally vertical direction about said axis of rotation when said musical movement is activated to accurately depict the proper manner in which a child should brush his teeth.

7. The device in accordance with claim 1 further comprising a timer in kinematic communication with said musical movement to visually indicate the length of time said musical movement has operated.

8. The device in accordance with claim 7 wherein said timer comprises:
   a. a disc rotatably mounted within said housing, a portion of said disc extending through a slot in said housing;
   b. indicia on said disc representing finite time periods; and
   c. means in cooperation with said musical movement for rotating said disc when said musical movement is started so that operation of said music movement for a set period of time will rotate said disc a set distance providing a visual indication of the length of time said musical movement has operated.

9. The device in accordance with claim 1 further comprising means for mounting said housing to a surface.

10. The device in accordance with claim 9 wherein said mounting means comprises at least one suction cup secured to said housing.

11. The device in accordance with claim 6 wherein said stationary display further includes a background and mounting means adapted to secure said fanciful character to said background said fanciful character being spaced therefrom, said representation of an arm having a portion being disposed on a plane behind said fanciful character and said representation of a hand carrying a toothbrush extending in front of said fanciful character.

12. The device in accordance with claim 11 wherein said background is provided with an arcuate slot, said first end of said connecting arm having said movable representations mounted thereon extending through said arcuate slot.

13. The device in accordance with claim 6 wherein said stationary display further includes a representation of a lavatory associated with said fanciful character.

* * * * *